United States Patent
Yan et al.

(10) Patent No.: US 9,558,240 B2
(45) Date of Patent: Jan. 31, 2017

(54) EXTENDING RELATIONAL ALGEBRA FOR DATA MANAGEMENT

(71) Applicant: MICROSOFT CORPORATION, Redmond, WA (US)

(72) Inventors: An Yan, Beijing (CN); Jing Luo, Beijing (CN); Yi Luo, Seattle, WA (US); Nan Li, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 363 days.

(21) Appl. No.: 14/298,651

(22) Filed: Jun. 6, 2014

(65) Prior Publication Data
US 2015/0356141 A1 Dec. 10, 2015

(51) Int. Cl.
G06F 17/30 (2006.01)

(52) U.S. Cl.
CPC ... *G06F 17/30454* (2013.01); *G06F 17/30466* (2013.01)

(58) Field of Classification Search
CPC .................. G06F 17/30463; G06F 17/30454; G06F 17/30466; H04L 67/288; G06Q 10/0633
See application file for complete search history.

(56) References Cited

U.S. PATENT DOCUMENTS

| 7,523,123 B2 | 4/2009 | Yang et al. |
| 7,590,620 B1* | 9/2009 | Pike ..................... G06F 11/1482 707/999.003 |
| 8,239,847 B2* | 8/2012 | Yu ........................... G06F 8/456 712/200 |
| 2010/0257198 A1 | 10/2010 | Cohen et al. |
| 2014/0032528 A1 | 1/2014 | Mandre et al. |
| 2014/0258266 A1* | 9/2014 | Cruanes ............ G06F 17/30463 707/718 |
| 2015/0234895 A1* | 8/2015 | Erdogan ........... G06F 17/30466 707/714 |

OTHER PUBLICATIONS

Thusoo et al. "Hive: a warehousing solution over a map-reduce framework", VLDB Endowment vol. 2 Issue 2, Aug. 2009, pp. 1626-1629.*
Yang et al. "Map-Reduce_merge: Simplified Relational Data Processing on Large Clusters", SIGMOD'07, Jun. 12-14, 2007.*

(Continued)

*Primary Examiner* — Yuk Ting Choi
(74) *Attorney, Agent, or Firm* — Jessica Meyers; Tom Wong; Micky Minhas

(57) ABSTRACT

Methods are provided for improving the ability to apply modeling techniques similar to relational algebra to an expanded number of workflows. By allowing a relational algebra type modeling technique to be applied to an expanded number of workflows, an increased number of data processing workflows can be more readily improved, such as by automatic modification of the sequence of tasks in a workflow, to reduce the execution costs for a workflow. The relational algebra type modeling technique can also allow for identification of portions of data processing workflows or queries that share a common input and output.

20 Claims, 12 Drawing Sheets

(56) References Cited

OTHER PUBLICATIONS

Chen et al. "Supporting Collective Queries in Database System for Data-intensive Workflow Applications". Information PRocessing Society of Japan, 2011.*
Braghetto et al. "USing Control-Flow Patterns for Specifying Business Processes in Cooperative Environments". Sac'07, Mar. 11-15, 2007.*
Antova, et al., "Fast and Simple Relational Processing of Uncertain Data", In IEEE 24th International Conference on Data Engineering, Apr. 7, 2008, 12 pages.
Yang, et al., "Map-Reduce-Merge: Simplified Relational Data Processing on Large Clusters", In Proceedings of the ACM SIGMOD international conference on Management of data, Jun. 12, 2007, 12 pages.
Friedman, et al., "SQL/MapReduce: A practical approach to self describing, polymorphic, and parallelizable user defined functions", In Proceedings of the VLDB Endowment, vol. 2 Issue 2, Aug. 24, 2009, 12 pages.
Price, et al., "A Relational Algebra for Basic Terms in a Higher-Order Logic", In Proceedings of Technical Report CSTR-13-004, Jul. 2013, 17 pages.
Ravindra, et al., "An Intermediate Algebra for Optimizing RDF Graph Pattern Matching on MapReduce", In Proceedings of the 8th extended semantic web conference on the semanic web: research and applications—vol. Part II, May 29, 2011, 16 pages.
Olston, et al., "Pig Latin: A Not-So-Foreign Language for Data Processing", In Proceedings of the ACM SIGMOD international conference on Management of data, Jun. 9, 2008, 12 pages.
Chaiken, et al., "SCOPE: Easy and Efficient Parallel Processing of Massive Data Sets", In Proceedings of the VLDB Endowment, vol. 1 Issue 2, Aug. 23, 2008, 12 pages.
Dittrich, et al., "Hadoop++: Making a Yellow Elephant Run Like a Cheetah (Without It Even Noticing)", In Proceedings of the VLDB Endowment vol. 3 Issue 1-2, Sep. 13, 2010, 12 pages.

\* cited by examiner

A

SELECT (Non Keyword Input = False)
131

REDUCE (C2 = FreqKeyword 1 – 10; C3 = Keyword 1 – 10; C1 = All Columns)
132

SELECT (Any of FreqKeyword 1 – 10 > Threshold)
133

SELECT (Any two of FreqKeyword 1 – 10 > Threshold)
134

B

SELECT (Non Keyword Input = False)
241

PROJECTION (Number of results accessed only)
242

SELECT (Location = Pacific Northwest)
243

REDUCE (C2 = FreqKeyword 1 – 10; C3 = Keyword 1 – 10; C1 = All Columns)
244

SELECT (Any of FreqKeyword 1 – 10 > Threshold)
245

C

SELECT (Non Keyword Input = False)
241

PROJECTION (Number of results accessed only)
242

REDUCE (C2 = FreqKeyword 1 – 10; C3 = Keyword 1 – 10; C1 = All Columns)
244

SELECT (Location = Pacific Northwest)
243

SELECT (Any of FreqKeyword 1 – 10 > Threshold)
245

*FIG. 3*

EXTENDING RELATIONAL ALGEBRA FOR DATA MANAGEMENT

BACKGROUND

A database management system (DBMS) is a software application that can be utilized to store data into, retrieve data from, and modify data stored in a database. The DBMS can typically interact with a user, other applications, and the database itself to achieve these purposes. It may be desirable that DBMSs manage data efficiently. However, the amount of data stored in databases has been continuously increasing. Furthermore, databases have become increasingly distributed. Many users may be simultaneously working on data pipelines of the database, and data may be flowing along those data pipelines. As such, it has become increasingly complex to manage the data efficiently.

Advances in processor and network capabilities have also increased the capabilities of using multiple processors working in parallel to perform complex computing tasks. This type of parallel processing can sometimes be referred to as "cloud computing." By distributing complex tasks across many processors, the overall time to complete a complex task can be reduced. Unfortunately, the ability to use parallel resources also means that a complex task may be performed multiple times by distinct processors, leading to waste of resources due to duplication of work.

SUMMARY

In various aspects, an expanded relational algebra is provided to allow for representation of additional tasks for processing of data. This can allow for modeling of an increased number of types of data processing workflows using principles similar to relational algebra. This can improve the ability to detect workflows that can be improved by altering the order of operations. This can also improve the ability to identify workflows that have portions suitable for execution in common so that the loss of resources due to tasks being repeated by multiple processors is reduced or minimized.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein:

FIG. 3 shows an example of modification of a sequence of operators during comparison of logical expressions.

DETAILED DESCRIPTION

Figure 1:
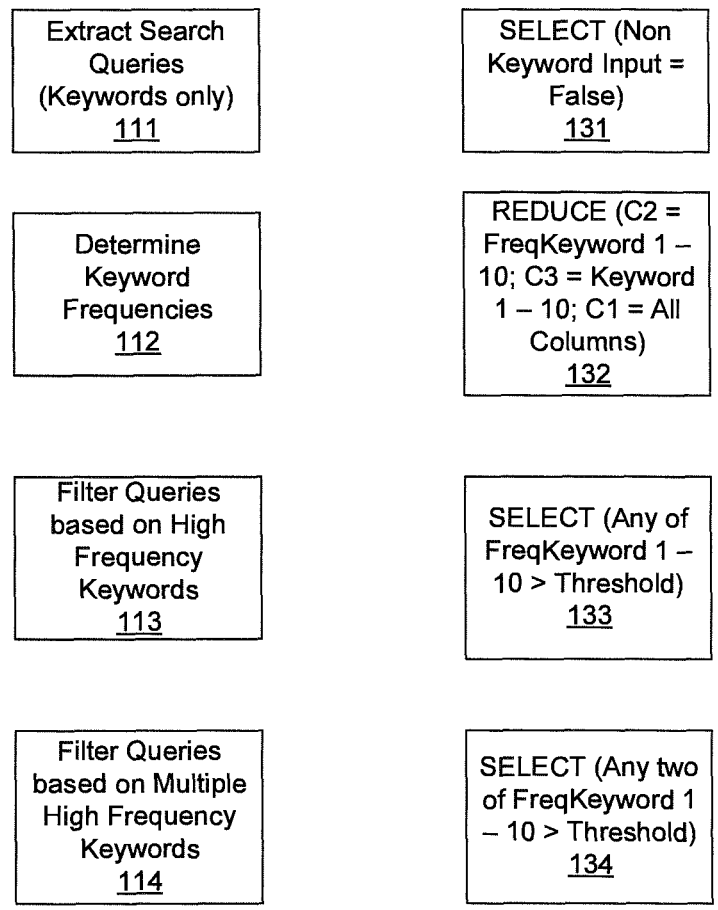
FIGS. 1 and 2 schematically show examples of workflows and corresponding logical expression representations of the workflows in an expanded relational algebra.

In various aspects, methods are provided for improving the ability to apply modeling techniques similar to relational algebra to an expanded number of workflows. By allowing a relational algebra type modeling technique to be applied to an expanded number of workflows, an increased number of data processing workflows can be more readily improved, such as by automatic modification of the sequence of tasks in a workflow, to reduce the execution costs for a workflow.

In various aspects, methods are also provided for improving the ability to identify queries (and/or corresponding data processing workflows and/or portions of data processing workflows) that share a common input and output. When queries or data processing workflows with common inputs and outputs are identified, the common portion(s) of a workflow can be performed once, and the output from the workflow can then be shared with multiple consumers of the workflow output. The multiple users can use the workflow output directly for data analysis, as an input for additional workflow(s), or for any other convenient purpose.

The identification of common portions of a query or corresponding data processing workflow can be facilitated in part by using an expanded version of relational algebra. Conventional relational algebra is defined by a set of operators that satisfy a listing of algebraic rules. The conventional relational algebra group of operators can be expanded to include a non-traditional operator, such as a "reduce" operator. While the reduce operator may satisfy less than all of the conventional relational algebra requirements, it can be constructed to work with only modest modifications of the relational algebra requirements. By expanding the list of permitted operators to include a reduce operator, additional functionality can be modeled using the expanded set of operators. This can allow relational algebra style techniques to be applied to a larger set of potential data workflows, allowing for increased identification of opportunities for elimination of redundant calculations. This can include both identifying existing workflows that can be combined, as well as analyzing new workflows provided by a user to determine if a new workflow matches an existing workflow.

Relational algebra is a well-established tool for modeling queries in relational data processing, such as queries for retrieving information from large databases and/or large data sets. Conventional relational algebra includes two parts: (1) A limited set of "operators" which could apply to a query for an input dataset; and (2) A limited set of "rules" among the defined operators. In conventional relational algebra, the primitive operators include operations such as projection, selection, and various joins and/or unions. The rules in conventional relational algebra correspond to equalities which describe if two operators can be switched/combined/split within a query plan tree under certain circumstances, without changing the result of the query plan.

In modeling a workflow (such as a workflow constructed based on a query for a data source), a logical expression in a relational algebra can be developed the corresponds to the workflow. For a workflow that has a corresponding relational algebra model or logical expression, the tasks in the workflow can correspond to operators in the logical expression.

Because of the well-defined operators and rules within conventional relational algebra, a query that can be modeled using relational algebra can be readily manipulated to alter the order of the operators in the model. A modified query and/or modified corresponding workflow can then be constructed based on the modified sequence of operators in the logical expression of the relational algebra model. In some aspects, the modified workflow corresponding to the modified logical expression can have a reduced execution cost relative to the original workflow, such as the original workflow that was constructed based on a received query.

An additional potential benefit of modifying the sequence of operators in a relational algebra model is that various rearrangements of the operators in a first modeled workflow can be performed in order to try to match the modeled workflow with another existing model of a workflow. If the operators in a model of a workflow, or in at least an initial portion of the model, can be matched with another existing model of the workflow by rearranging the operators according to the rules of relational algebra, the models and the corresponding portions of the workflows are the same. This can allow the matched workflow portions to be performed only once and then the results can be provided to multiple end users for consumption.

One difficulty with modeling queries and/or workflows with conventional relational algebra is that only a limited number of operators are provided in the relational algebra. In particular, the operators described in a relational algebra model primarily correspond to operators that sort and select from an existing data set. For example, conventional operators in relational algebra may specify a first set of columns that are used to identify the columns used for an operation, such as specifying columns using a "projection" operator. Conventional operators may also specify a second set of columns that identify the rows to use for an operation, such as specifying the required data values within a row for a row to be selected in a "selection" operation. Unfortunately, conventional operators do not include an option for specifying a new column of data that is distinct from the columns present in the data prior to use of the conventional operator. This means that conventional relational algebra is not suitable for modeling tasks that perform an operation (such as an arithmetic calculation) on a column (or table) of data such as determining an average value or summing a group of numbers having a given attribute. As a result, many practical tasks for processing of large data tables and/or large data sets cannot be modeled using conventional relational algebra. This can limit the ability to automatically identify situations where queries and/or workflows represent the same data workflow, and in particular can limit the ability to identify queries and/or workflows where rearrangement of tasks could allow for identification of common portions of two (or more) workflows.

In various aspects, the above difficulties can be overcome in part by creating an expanded set of relational algebra operators. For example, the set of relational algebra operators that can be used for modeling a query or workflow can be expanded to include an operator that can represent various arithmetic tasks that result in creation of one or more additional data columns. The additional data columns can contain data or dimension values that may not be originally present in the data set, and/or that may produce a final data set with a different cardinality than a cardinality suggested by the original data set. In this discussion, this new operator used to provide an expanded relational algebra is referred to as a "Reduce" operator.

In various aspects, a "Reduce" operator can be incorporated into relational algebra modeling (using an expanded relational algebra) to allow for modeling of tasks that involve creation of a new type of output column not present in an original data set. For a Reduce operator as defined herein, three types of columns are specified in order to model a corresponding task. The first type of column(s), referred to herein as "C1", is one or more columns that specify how data is grouped or identified for use in the task corresponding to the Reduce operation. This can be similar to the specification of columns for a conventional relational algebra "projection" type operator, where an entire column is specified, or this can be similar to the specification of columns for a "selection" type operator, where an operation is performed only on rows where the value or dimension in a grouping column matches a specified value or dimension in the C1 definition. The data specified in C1 also represents a portion of the data output from the Reduce operation. In this discussion, the C1 columns for a Reduce operator can be referred to as "grouping" or "group-by" columns for the Reduce operator.

The second type of column(s), referred to herein as "C2", is a specification of one or more new output columns that are included in the output from the tasks corresponding to the Reduce operation. This is a specification not used for conventional relational algebra modeling. The new output column(s) can represent any convenient type of output that can be generated based on the data of one or more selected input columns.

The third type of column(s), referred to herein as "C3", is a specification of one or more columns that are used to generate the values that will populate the new C2 output column (or columns). The values in the C3 column(s) can be used in any convenient manner to generate the values for the C2 column(s), such as by performing arithmetic operations on the values. It is noted that if the C3 column(s) are desired as part of the output from the task corresponding to the Reduce operation, the C3 columns should also be specified as part of the C1 group-by column specification.

The above provides a general description for a Reduce operator for modeling of data workflows or (corresponding queries) using an expanded relational algebra. An example of a general format for writing a Reduce operator during modeling would be to write the Reduce operator as $\text{Reduce}_{C2(C3), \, GroupBy=C1}(T)$, where T is the data set that the reduce operation is performed upon. It is noted that for relational algebra modeling purposes, the specific nature of the manipulation performed on the C3 column(s) in order to generate the C2 output column(s) is not specified. Instead, similar to conventional relational algebra modeling, the nature of the operation is reflected only in the labels used to specify the columns. Thus, in order to verify that two reduce operators perform a similar operation, the column label or labels for the C2 output columns would need to be similar.

The above definition for a Reduce operator provides a general case for the operator. To further illustrate the nature of the definition of the Reduce operator for modeling a data workflow, two boundary or limiting examples of a Reduce operator can be considered. In a first example, a Reduce operator can be used to model a task where each row in a data table is treated as a "group" for performing a task. This can be described as a situation where the C1 columns are defined as "all columns" within a data set. In a second boundary example, the entire data set or other input relation can be used as the "group" for performing a task. This can be described as a situation where the C1 columns are defined as "null" for the corresponding Reduce operator in a logical expression for modeling the workflow. For both of these boundary type examples, the output columns C2 and the columns that provide the input for manipulation C3 can be specified as described above.

Based on the above definition for a Reduce operator, the following are examples of rules for when the position of a Reduce operator can be switched in a logical expression (for modeling a workflow) with another operator. For example, a Reduce operator and a "selection" operator can be switched in a workflow model if the grouping columns (C1) for the Reduce operator are the same as or a superset of the columns for the selection operator. For a "projection" operator, the Reduce operator and the projection operator can be switched in a workflow model if the input columns (C2) for the Reduce operator correspond to only the columns specified by the "projection" operator. It is noted that for such a "projection" operator having the same columns specified as the input columns by the Reduce operator, the projection operator would be redundant when located after the Reduce operator and thus can be removed from the model for the workflow.

Determining whether a Reduce operator can be switched with one of the various types of "join" or union operators in a logical expression based on an expanded relational algebra is dependent on the nature of the join operation. In general, Reduce operators as defined herein cannot be switched with "join" operators. In the general case, since the nature of the data manipulation within a task modeled by a Reduce operator is not captured within the model, the presence of additional rows (including duplicate rows) within a data table may alter the output generated by the task corresponding to the Reduce operator. As a result, a Reduce operator cannot generally be switched with a "join" operator in a logical expression (model) in an expanded relational algebra. However, there are exceptions to this general rule for two specific types of "join" operators One exception is a situation where a workflow model contains a Reduce operator and a "semi-join" operator. A "semi-join" operator represents a task involving two data tables. In a task modeled by a "semi-join" operator, a first data table contains one or more tuples (rows) of data, a second table contains at least one tuple of data, and the first and second tables have at least one column X corresponding to the same category. For example, both tables may have a column titled "Department" which specifies a value/dimension such as "accounting", "human resources", or "engineering". In this situation, a task corresponding to a semi-join operator can be performed by selecting each row from the first table where the tuple value in column X is the same as one of the values in the corresponding column X in the second table. Using the above example, if the second table contains only the values "accounting" and "human resources" for the various rows in the second table, a task corresponding to a semi-join operation would select the rows from the first table having the values "accounting" or "human resources" in column X while not selecting the rows from the first table having the value "engineering". For a semi-join type operator, if the group-by columns C1 of the Reduce operator are the same or a superset of the join key for the "join" operator, the operators can be switched in a model workflow.

The other exception is when a workflow model contains a Reduce operator and a "foreign key join" operator. In a task corresponding to a "foreign key join", a first table includes a column Y corresponding to a category, a second table also includes the column Y, and both tables include at least one tuple (row) of data. The values in column Y of the first table are used as a "foreign" key for the second table. The output of the foreign key join is to supplement the tuples or rows from the first table with the values from the second table by adding the columns from the second table different from the column Y. The values added to each tuple or row in the first table based on the values in the row of the second table that have the same value (or key). When a workflow model contains a Reduce operator and a "foreign key join" operator, if all of the input C3 columns for the Reduce operator are from the table that contains the foreign key (the first table as described above), and if the group-by columns C1 are the same or a superset of the foreign key, then the Reduce operator and the "foreign key join" operator can be switched in the workflow model. It is noted that if a Reduce operator and a "foreign key join" operator are to be switched, any columns in the second table can be included in the group-by columns C1 of the Reduce operator so that the values from the second table are present in the output from the Reduce operator.

Relational algebra also generally permits the merging and splitting of operators of the same type when modelling a workflow. However, Reduce operators in an expanded relational algebra cannot be merged or split.

Altering Order of Operations in Data Flows

One of the potential benefits of being able to apply an extended relational algebra model to workflows that include a task corresponding to a Reduce operation is the ability to automatically identify opportunities to optimize workflows to reduce the amount of data being processed. In other words, the cost of execution of a workflow can potentially be reduced or minimized by modifying the order of execution of the tasks in the workflow, while still obtaining the same end result. Because relational algebra represents tasks using a limited set of operators bound by a limited set of rules, alternative task workflows can be developed using automated processes with a reduced or minimized concern that an alternative workflow will change the final product.

Figure 4A:
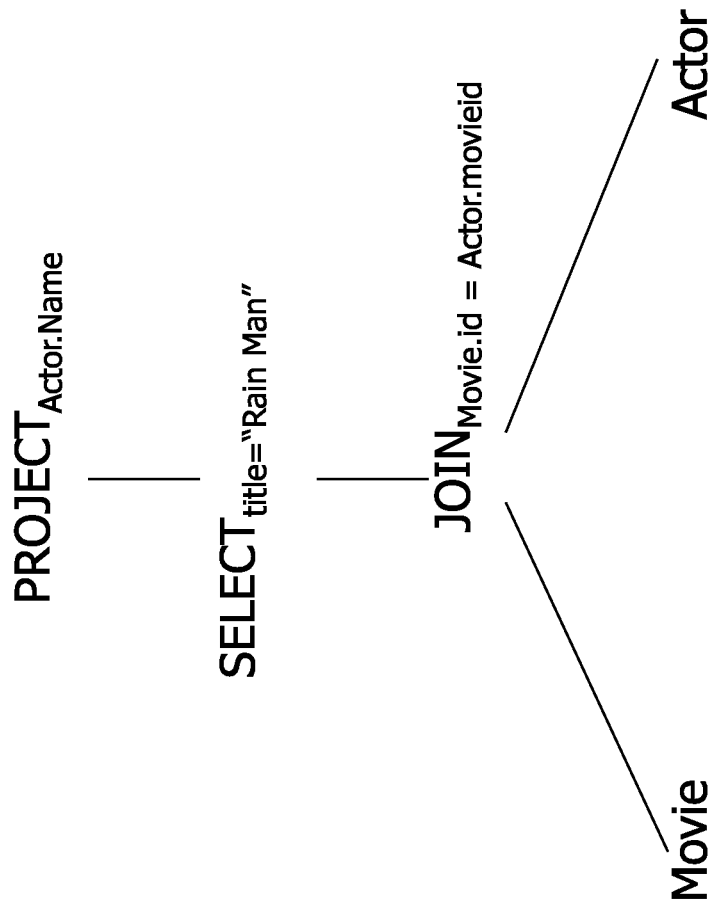
FIGS. 4A, 4B, 5A, and 5B schematically show examples of modification of sequences of operators to reduce execution costs for corresponding workflows.
Figure 4B:
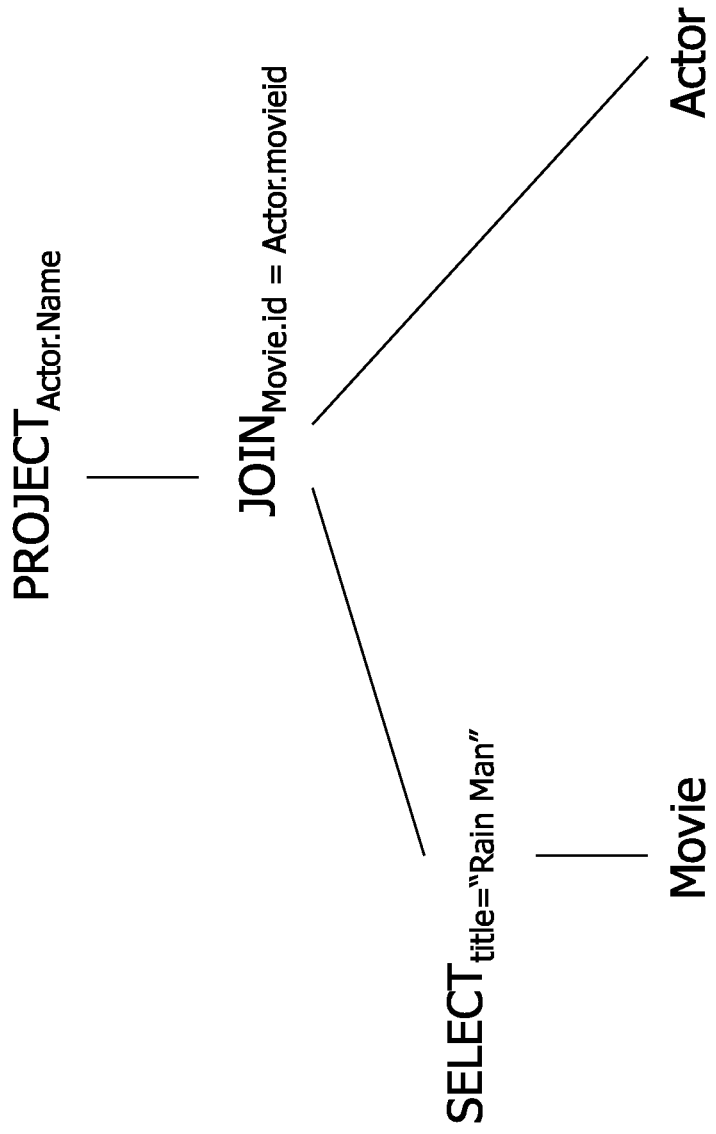

FIGS. 4A and 4B show an example of a use of conventional relational algebra for improving a data processing workflow. In FIG. 4A, a user has submitted a query to identify the names of actors who were in the movie "Rain Man". In order to determine these actors, the user develops a query that first joins a data set related to movies with information from a data set for actors, based on actors who have the same "movie_id" as an "id" from the movie data set. This is an example of a "foreign key join" operation. The user then selects information related to the movie "Rain Man" from this joined data set. Finally, the user identifies the actors in the movie by projecting just the names of the actors from the data set selected in the previous task. FIG. 4A represents a relational algebra model of this type of query.

The hypothetical original user query in FIG. 4A, as modeled using a relational algebra, can be improved to reduce the amount of data that is passed between tasks in the workflow. In FIG. 4A, the "join" operation is performed on the entire original "movie" data set and the entire original "actor" data set. The amount of data processing, however, can be reduced or minimized by switching the order of operations for the selection of the movie "Rain Man" and the join operation. Under the rules of relational algebra, the select operation can be switched with the join operation as shown in FIG. 4B. In the improved relational algebra model in FIG. 4B, the join operation is now performed on only the portion of the movie data set corresponding to the movie "Rain Man". In a corresponding workflow constructed based on the modified logical expression in FIG. 4B, this means that only the row (or rows) corresponding to "Rain Man" are processed in the task corresponding to the join operation, leading to a substantial savings in the amount of data that is processed. This demonstrates the ability of relational algebra to allow for automatic identification of alternative (improved) workflows based on a user query. In other words, relational algebra modeling can allow an untrained user to submit a workflow in a manner that is logical for the user while still allowing the resulting workflow that is performed by a processor to correspond to a workflow with improved characteristics, such as reduced execution costs.

Figure 5A:
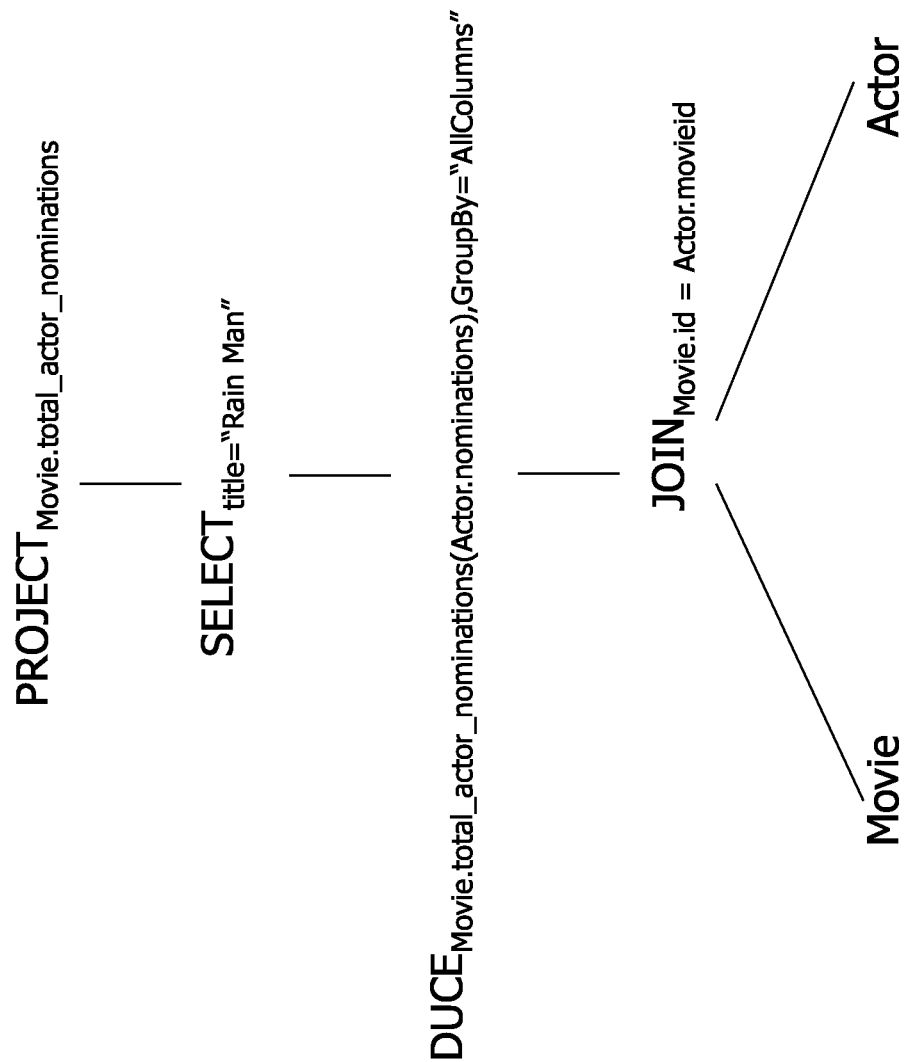
Figure 5B:
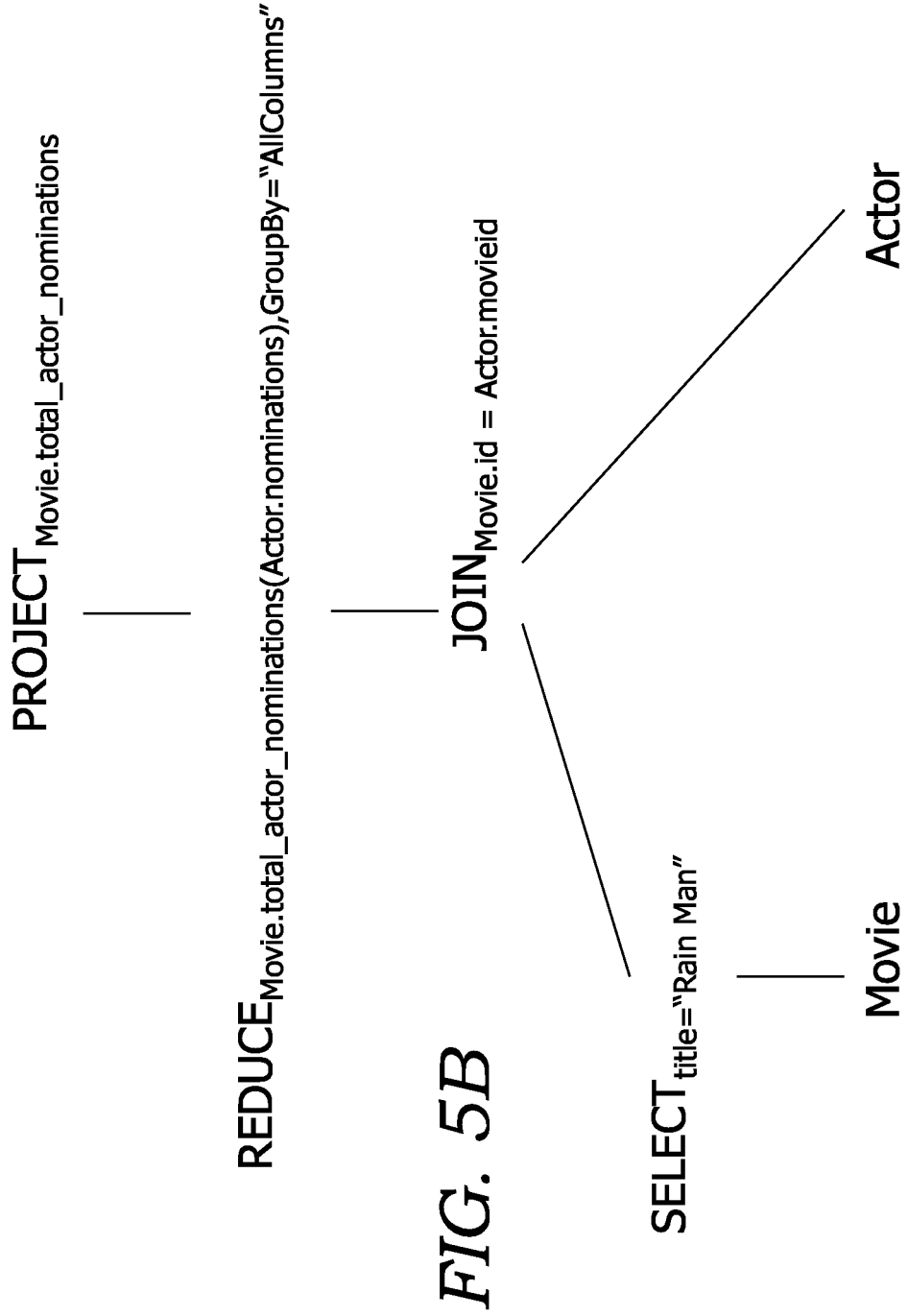

FIGS. 5A and 5B provide a simplified example of how expanding a relational algebra to include a Reduce operation can allow additional data workflows to be considered for improvement. In FIG. 5A, a user query similar to the query in FIG. 4A is modeled. However, in the hypothetical query shown in FIG. 5A, the user is interested in determining the total number of academy award nominations that have been received by the actors in the movie "Rain Man". In FIG. 5A, the user once again starts with a join of the "Movie" data set and the "Actor" data set. The user than adds to the query a task to determine the total number of Academy Award nominations received by the actors in each movie. As shown in FIG. 5A, this corresponds to a Reduce operation on the grouping (C1) of "all columns" to use the value of all Academy Award nominations for each actor (input column or C3) to arrive at a combined value (output column C2) for each movie. It is noted that "all columns" is used as the group-by or C1 value so that the Reduce operation maintains all other data in the data set while performing this operation. Thus, the net outcome of the Reduce operation on the data set is to add a column to the data set. Next, similar to the query modeled in FIG. 4A, the user selects the movie "Rain Man". Finally, the user query identifies the number of Academy Award nominations by projecting this value.

For the task flow represented in FIG. 5A, due to the presence of a task corresponding to a Reduce operation, conventional relational algebra would not be suitable for modeling the task flow, which would prevent any automatic optimization efforts using the rules of conventional relational algebra. However, using an expanded relational algebra, the task corresponding to a Reduce operation can be modeled. Based on the rules for the Reduce operator, it is noted that the select operation involves a subset of the group-by (C1) columns of the Reduce operation. As a result, the select operation can be switched with the Reduce operation, and then switched with the join operation similar to FIG. 4B to arrive at the improved task flow in FIG. 5B. Once again, a substantial savings in data manipulation can be achieved, as the task flow in FIG. 5B only requires determining the number of academy award nominations for the movie Rain Man, as opposed to all movies in the Movie data set.

EXAMPLE

Application of Expanded Relational Algebra Modeling to Data Mining Worflows

Another example of use of an expanded relational algebra is in identifying workflows (i.e. task flows) or data queries for use in creating workflows that have common tasks, so that a series of tasks can be performed once instead of having multiple processors repeat the same series of tasks. Data mining of large data sets is an example of an application where this feature of the expanded relational algebra can be useful.

Data mining for large data sets can require a large number of related tasks. The data for the large data set can be obtained or accumulated, possibly from multiple sources having different data formats. The data can then be cleaned in order to extract the information desired for data mining from the various data formats. The information can then be sorted or placed in a catalog, so that information of various types can be found in an expected location. One or more types of analysis can then be performed on the sorted data. For large data sets, each data processing/transforming/analyzing operation can take several hours using a large number of computers.

In order to achieve a desired set of results, multiple types of analysis on a set of data may be required. For example, it may be desirable to perform one or more time series analysis operations, one or more frequency type analysis operations, and one or more clustering analysis operations on a data set to achieve a desired set of outputs. These operations, possibly in the form of modules, can be arranged in a proper order to achieve a result and then submitted together as a job.

One difficulty in assembling a job for data mining can be related to creating a job that will become parallel in an effective manner. A portion of creating an effective parallel job for data mining of a large data set can be related to dividing a repetitive task performed on the large data set over a plurality of processors. This type of parallelization can be handled directly by a variety of known parallelization algorithms. A more difficult type of parallelization can be related to identifying locations within a long computational flow where a given calculation is repeated for the same data set more than once. For example, a first set of computations may be required for a frequency analysis on a data set. A second set of computations may be required for a different frequency analysis. A third set of computations may be required for a clustering analysis. Although each type of analysis is distinct, there can be locations in each set of computations where a given function is applied to the same data set. Conventionally, each set of computations can be performed without reference to the other sets, resulting in the repeated calculation on the data set being performed three times. However, if the repeated calculations can be identified in advance, the common calculations could be saved and/or applied to each relevant location. Instead of performing the common calculations multiple times, a calculation can be performed once and a data lookup used to provide the data for the remaining instances of the common calculation.

An expanded relational algebra as described herein can be used to facilitate assembling jobs for data mining. As an example, a series of basic tasks involved in data mining can be written in a conventional relational programming language. This can be a general programming language such as SQL or the SCOPE scripting language that can be used for handling parallel jobs in the Cosmos parallel operating environment. Alternatively, some or all of the basic tasks can also be in a language built upon a procedure language, such as C++ or C#, or a functional programming language, such as "Haskell" or "F#". By using an expanded relational algebra to represent the data mining workflow, the tasks that can be effectively modeled are not limited to tasks involving existing data from a data set. Instead, a Reduce operator can be used to also model tasks in the data mining workflow that result in creation of new columns, such as aggregated data values.

The following provides a schematic example of using expanded relational algebra to identify common tasks within multiple workflows. The following data mining tasks are intended as examples, as use of expanded relational algebra can be applied generally to a variety of data mining tasks and/or to other tasks involving manipulation of large data sets, such as developing a workflow based on a database query submitted by a user.

In this example, a user can represent or model a data mining job using an expanded relational algebra. The goal of the data mining job in this example is to perform two types of data mining analysis on data from search engine logs. One type of analysis can be an analysis to improve document relevance for documents that may be responsive to search queries that include multiple high frequency keywords. In search queries received by search engines, some keywords may appear in received search queries with a frequency above a threshold value. In order to provide a convenient example for illustrating the application of modeling with an expanded relational algebra, this simple test for determining the presence of high frequency keywords can be used.

A second type of data mining can be used to investigate regional differences in the use of high frequency keywords. Queries containing high frequency keywords can be identified. The identified queries can then be sorted into various regions or locations. The regions can correspond to any convenient geographic area, such as a zip code, a city, a state, or an arbitrary geographic region. The click through rates and/or page view times can then be analyzed on a per region basis, to determine if any location based or regional based factors should influence the document rankings.

In order to perform this data analysis, one or more initial logfiles can be obtained from, for example, a search engine that collects data on queries submitted to the search engine. The search queries and accompanying data can be extracted from some type of original data source, such as a raw logfile from the search engine, or possibly a logfile that has been refined using one or more standard filtering techniques to remove, for example, unparseable data, queries related to undesirable topics, or data that appears to be related to an error in operation of the search engine. To facilitate analysis, the search queries and accompanying data from the logfile can also be organized to have an expected format, such as by constructing a data table containing information for each query. For example, multiple columns in the table can be used so that each keyword in the query is placed in a separate column within the row for a query. Other columns could indicate situations where other types of information form part of the query, such as using one or more images and/or image features as part of the query. Various other types of data can be stored in the table (or possibly multiple tables) for the subsequent analysis.

The data analysis tasks described above can be performed by building up an overall data mining workflow computation from a series of smaller tasks that are performed on an initial data set. First, smaller tasks for performing the multiple high frequency keyword analysis can be identified. The tasks described here can describe a computation level that is still relatively high compared to basic functions. This high level of abstraction is used for convenience here to illustrate the concept. One example of identifying smaller tasks, shown in FIG. 1, can be to have a task for extracting search queries 111 to form a set of search queries that only contain keywords, as opposed to queries that are also based in part on images, videos, or other non-keyword input. It is noted that this filtering task (and all of the other tasks in the various examples) are provided here to demonstrate the modeling of a data flow, and are not required. Another task can be counting instances of keywords 112 in the extracted queries to determine any keywords that occur frequently enough to be considered "high frequency" keywords. Still another task can be filtering the extracted search queries 113 to keep queries containing a high frequency keyword. Yet another task can be identifying queries 114 with more than one high frequency keyword.

Each of the above tasks can be represented by an operator in a model based on an expanded relational algebra. As shown in FIG. 1, extracting search queries from an initial logfile. This task can be represented as a selection task 131 in an expanded relational algebra. For example, one of the columns in the logfile can be a Boolean type data column which indicates whether or not non-keyword input was used as part of the query. In such an example, the filtering task 111 can be expressed as selection task 131 as shown in FIG. 1, with the selection criteria being based on the "Non Keyword Input" value being equal to "False". Note that this is provided as just an example, and those of skill in the art would readily understand that other methods of organizing a data logfile and/or formulating a selection operation can be used to achieve a similar outcome.

The next task of counting instances of keywords 112 represents an operation that cannot be readily modeled using conventional relational algebra. As a result, due to the presence of task 112, the sequence of tasks 111-114 would not be suitable for modeling using conventional relational algebra, thus creating difficulties and/or preventing the use of a relational algebra model for comparing sequence of tasks 111-114 with other data mining workflows. However, using an expanded relational algebra, task 112 can be modeled as a Reduce operation 132. For Reduce operation 132, one option is to have the "group-by" columns (C1) correspond to an "all columns" definition. For modeling task 112, the goal of the task is to determine keyword frequency, and add the keyword frequency value for each keyword to the data set. Although the operation is labeled as a "reduce" operation, in this example for modeling task 112, it may be desirable to retain all columns of data for further analysis. This is how the Reduce operator 132 is shown in FIG. 1. Alternatively, if the columns from the data set that are of interest are known, the specification for C1 for the Reduce operator could correspond to all of the known desired data columns With regard to the output columns (C2), the output columns correspond to the keyword frequency for each keyword in a query. For example, if the original logfile used as the data source contains 10 columns for keywords, possibly having labels "Keyword1" to "Keyword10", the new output columns in C2 can be "FreqKeyword1" to FreqKeyword10". In such an example, the input columns (C3) would then correspond to the columns "Keyword1" to "Keyword10", as these columns represent the columns for aggregating the number of occurrences of a given keyword.

The next task is filtering of queries 113 to identify the queries containing a high frequency keyword. This can be modeled as a selection operation 133, where the selection criteria corresponds to having any of columns "FreqKeyword1" to "FreqKeyword10" contain a value greater than a threshold value. Task 114 can similarly be modeled as a selection operation 134, where two of the columns "FreqKeyword1" to "FreqKeyword10" contain a value greater than the threshold value.

A similar task breakdown can be provided for the analysis of queries containing a high frequency keyword on a regional basis. As an example, it may be desirable to analyze queries submitted from a geographic region, such as the Pacific Northwest, that contain a high frequency keyword. For this example, the desired analysis is limited to analyzing the click-through analysis based on the number of results that are accessed on an initial results page. Thus, only the data columns related to accessing results need to be maintained. The data columns related to, for example, the amount of time a user spends interacting with a page, can be dropped from the data to reduce the amount of data being processed.

Figure 2:
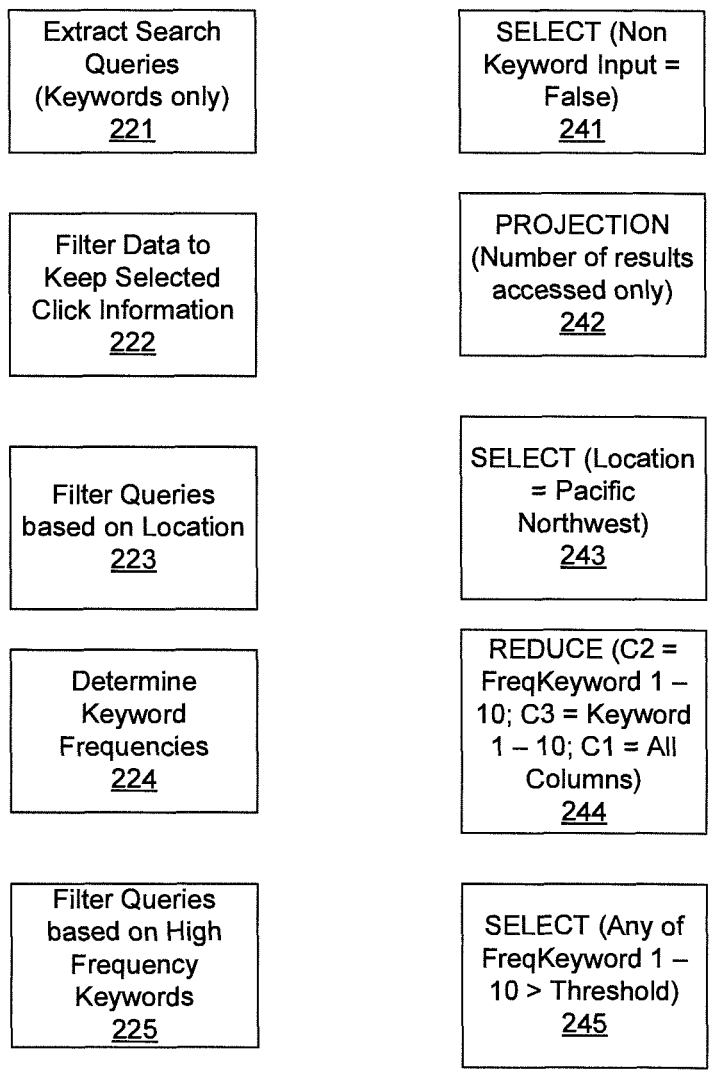

FIG. 2 shows an example of the tasks for performing a regional analysis and for modeling such a workflow. In the example shown in FIG. 2, one task can correspond to a task for extracting search queries 211 to form a set of search queries that only contain keywords. This task is performed on the same original data set used for the tasks shown in FIG. 1. Another task can be reducing the number of data columns that are required 212, since only data related to number of results accessed on a results page is needed for subsequent analysis. Still another task can be filtering queries 213 based on the having the location "Pacific Northwest" associated with the queries. Yet another task can be determining the frequencies of keywords in queries. Still another task can be filtering the extracted search queries 214 to keep queries containing a high frequency keyword. This sequence of tasks can provide a smaller data set that is suitable for a focused investigation of regional search activity.

In FIG. 2, task 221 for modeling extraction of search queries containing only keywords can be modeled as a selection operation 241, similar to the selection operation 131 in FIG. 1. Task 222 can be modeled as a projection operation 242. Task 223 can be modeled as a selection operation 243, with rows containing the correct value in the "location" column being selected. Tasks 224 and 225 can be modeled as a Reduce operation 244 and a Selection operation 245, similar to the Reduce operation 132 and Selection operation 133.

Based on the tasks in the two workflows, it is not initially apparent that the tasks in FIG. 1 are sufficiently similar to the tasks in FIG. 2 to allow for any common data processing. However, by using the expanded relational algebra, the model of the tasks in FIG. 2 can be rearranged to determine whether any common portions exist for the workflow. In FIG. 3, column A shows the modeled operations from the first workflow as the first set of operations. The model of the tasks from FIG. 2 is the second set of operations (column B). In comparing the workflows from the examples in FIGS. 1 and 2, it is noted that the first operator is the same in both workflows. However, the second operator in column A is a Reduce operator, while the second operator in column B is a projection.

Using the rules of the expanded relational algebra, the Reduce operator in column B can be switched with the preceding operations in order to investigate whether both modeled workflows are the same. Column C shows a switch in the model position for selection operation 243 and Reduce operation 244. Under the rules of the relational algebra, this switch is permitted, as the group-by columns (C1) of the Reduce operator 244 are a superset of the columns used for the selection 243. However, no further switching can be performed for the Reduce operator 244, as the input columns for the Reduce operator 244 are not the same as the columns for the projection operation 242. As a result, the modeled workflows from the Examples in FIGS. 1 and 2 only share the initial selection operation 131 and 241. In the corresponding workflows, this means that either task 111 or task 221 can be performed, and both workflows can share the common output from this task.

It is noted that if projection operation 222 were not present, the second operator in column C would be Reduce operator 244. This would allow for elimination of one of tasks 112 or 224, thus allowing for additional savings in computational time. Alternatively, if the projection operation 222 were based on the same columns as the input columns (C2) for the Reduce operation 224, the operators 242 and 244 in column C could be switched, which would also allow for additional savings.

The above examples described a comparison of two existing workflows for data mining. In various aspects, instead of modeling an existing workflow, the expanded relational algebra can be used to model a query that would lead to construction of a workflow.

Data Processing Environments

Figure 7:
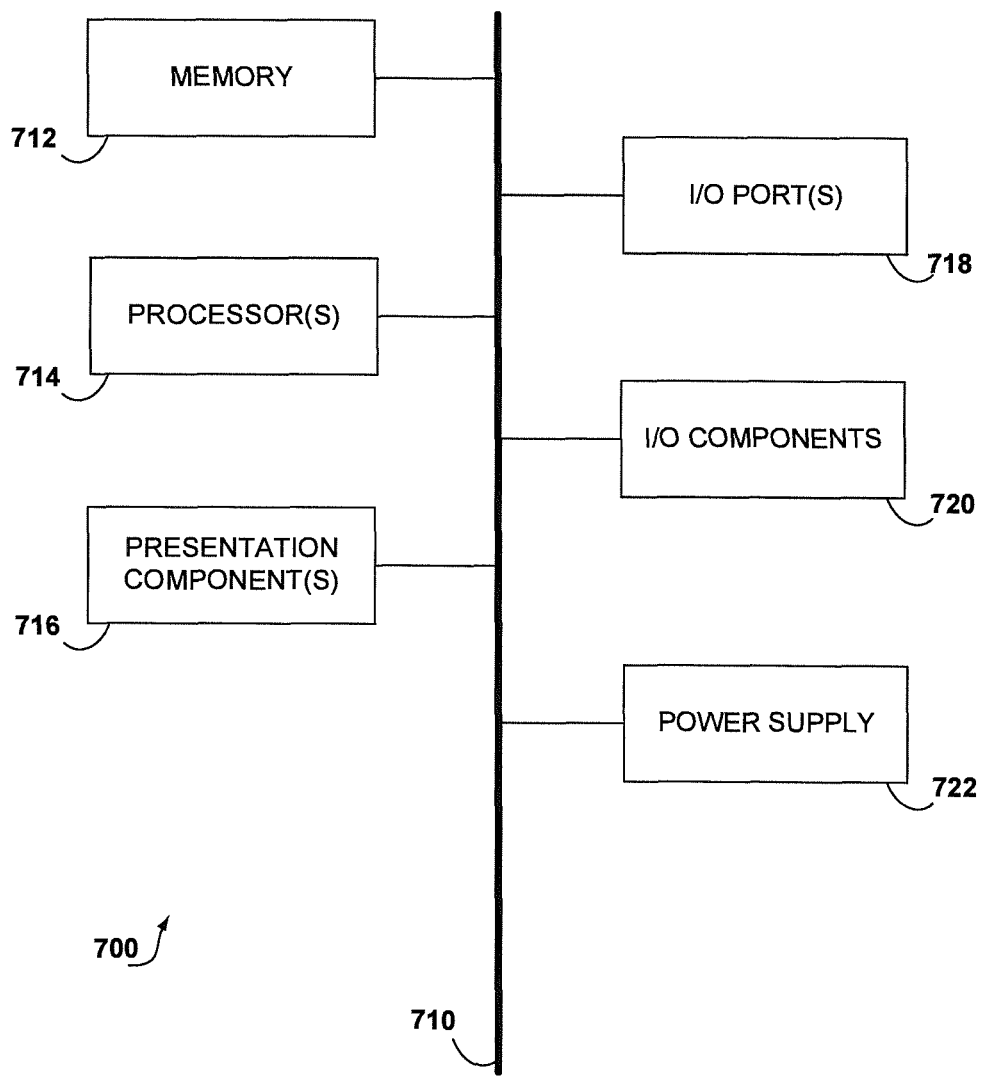
FIG. 7 is a block diagram of an exemplary computing environment suitable for use in implementing embodiments of the present invention.

FIG. 7 is a block diagram of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 702 that directly or indirectly couples the following devices: memory 704, one or more processors 706, one or more presentation components 708, input/output (I/O) ports 710, I/O components 712, and power supply 714. Bus 702 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component such as a display device to be one of I/O components 712. Also, processors, such as one or more processors 706, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal, and the definition of computer storage media in the discussion herein explicitly excludes such propagated data signals and other modulated data signals.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 704 includes computer-storage media in the form of volatile and/or nonvolatile memory. Memory 704 may be removable, nonremovable, or a combination thereof. Exemplary memory includes solid-state memory, hard drives, optical-disc drives, etc. Computing device 700 includes one or more processors 706 that read data from various entities such as bus 702, memory 704 or I/O components 712. One or more presentation components 708 presents data indications to a person or other device. Exemplary one or more presentation components 708 include a display device, speaker, printing component, vibrating component, etc. I/O ports 710 allow computing device 700 to be logically coupled to other devices including I/O components 712, some of which may be built in computing device 700. Illustrative I/O components 712 include a microphone, joystick, game pad, satellite dish, scanner, printer, wireless device, etc.

Figure 6:
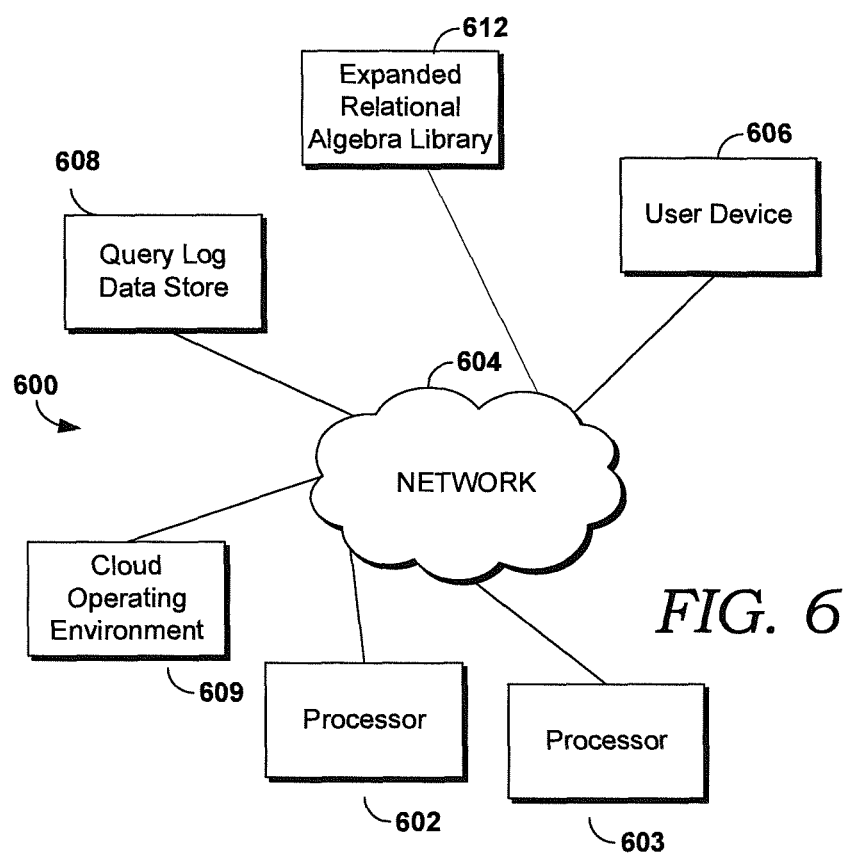
FIG. 6 schematically shows a network environment suitable for performing embodiments of the invention.

With additional reference to FIG. 6, a block diagram depicting an exemplary network environment 600 suitable for use in embodiments of the invention is described. The environment 600 is but one example of an environment that can be used in embodiments of the invention and may include any number of components in a wide variety of configurations. The description of the environment 600 provided herein is for illustrative purposes and is not intended to limit configurations of environments in which embodiments of the invention can be implemented.

The environment 600 includes a network 604, a user device 606, a query log data store 608 and an expanded relational algebra library 612. The environment also includes a processors 602 and 603 which are part of the cloud computing resources that can be accessed by jobs run using cloud operating environment 609. The network 604 includes any computer network such as, for example and not limitation, the Internet, an intranet, private and public local networks, and wireless data or telephone networks. The user device 606 can be any computing device, such as the computing device 500, from which a search query can be provided. For example, the user device 606 might be a personal computer, a laptop, a server computer, a wireless phone or device, a personal digital assistant (PDA), or a digital camera, among others. In an embodiment, a plurality of user devices 606, such as thousands or millions of user devices 606, can be connected to the network 604. Similarly, processors 602 and 603 are representative of any number of processors that could be connected by a network 604 for use in a parallel or cloud computing environment. Optionally, one or more of processors 602 or 603 could be a user device as well. Cloud operating environment 609 represents an operating system or interface that allows a user to submit jobs for execution in the environment.

Query log data store 608 can represent one or more databases or other data storage structures that contain query log information that can be targeted for data mining. The data in query log data store 608 can originally be based on one or more types of search engine interfaces. A user can use expanded relational algebra library 612 to model data processing workflows. The library 612 can also include automatic routines for identifying potential variations of a workflow that are permitted under the rules of a relational algebra, either for identification of workflows with reduced execution costs or determining that two workflows having a common sequence of tasks.

Additional Examples

Figure 8:
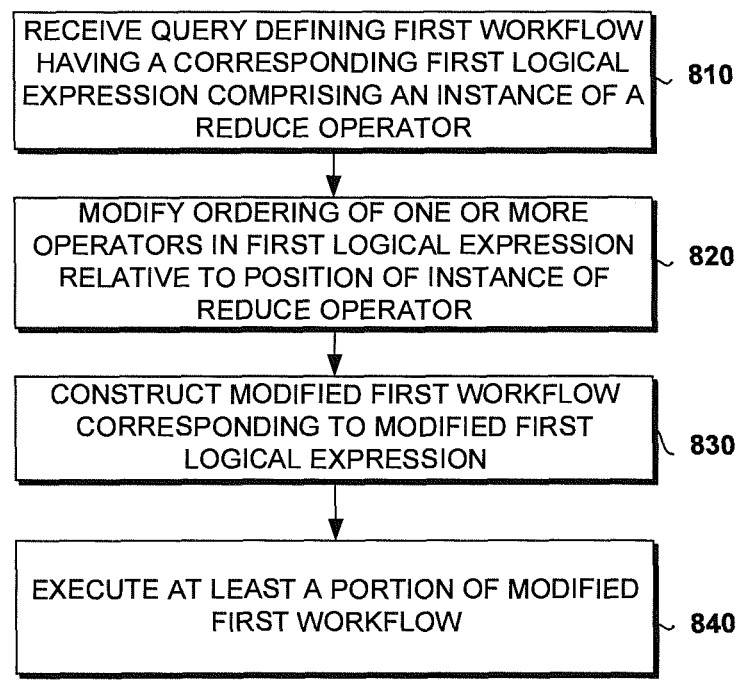
FIGS. 8, 9, and 10 schematically show examples of methods according to some embodiments of the invention.

FIG. 8 shows an example for a method of using an expanded relational algebra to modify a workflow based on a received query for a data set. In FIG. 8, a query defining a first workflow is received 810. The first workflow defined by the query has a corresponding first logical expression in an expanded relational algebra. The corresponding first logical expression includes an instance of a Reduce operator. The ordering of one or more operators in the first logical expression is then modified 820 relative to a position of the instance of the Reduce operator. This can correspond to moving one or more operators from a position prior to the Reduce operator in the sequence to a position after the Reduce operator; moving one or more operators from a position after the Reduce operator in the sequence to a position prior to the Reduce operator; or a combination thereof. Based on the modified first logical expression, a modified first workflow can be constructed 830. At least a portion of the modified first workflow can then be executed 840 to perform the desired data processing operation requested via the original query.

Figure 9:
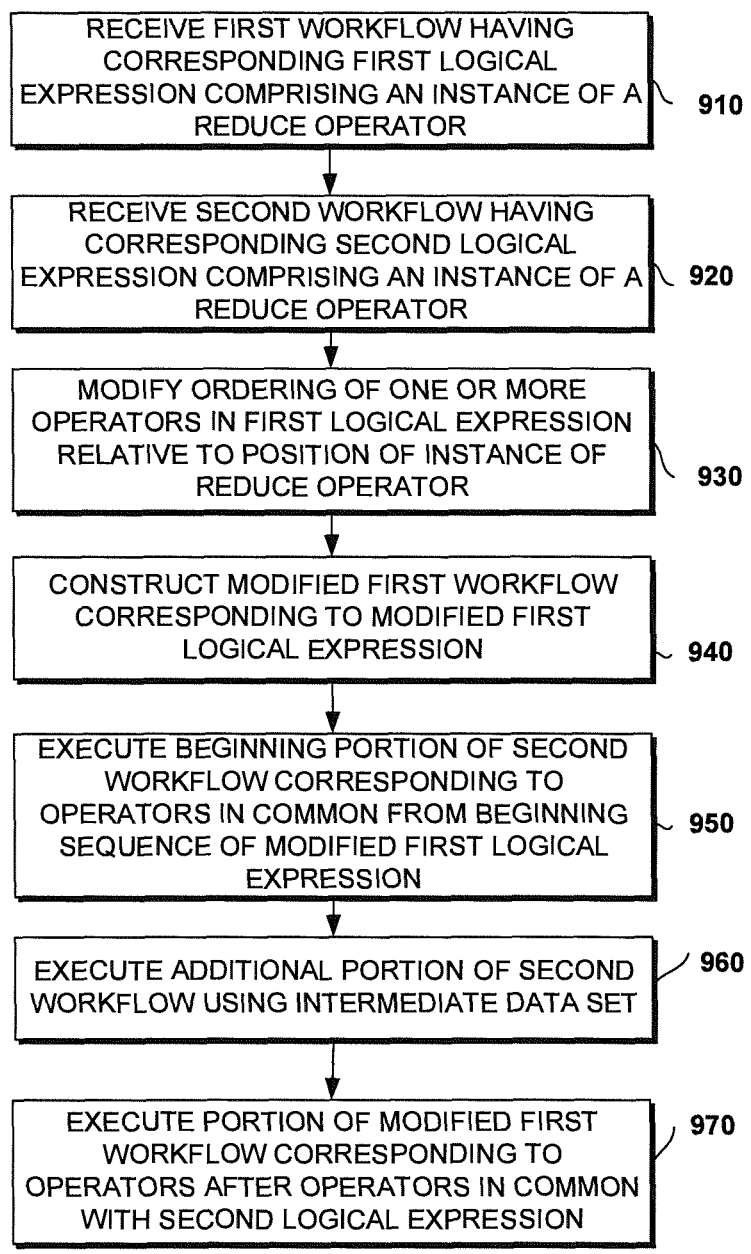

FIG. 9 shows an example for a method of using an expanded relational algebra to modify a workflow in order to identify common tasks between the beginning portions of two workflows. In FIG. 9, a first workflow is received 910. The first workflow has a corresponding first logical expression in an expanded relational algebra. The corresponding first logical expression includes an instance of a Reduce operator. Optionally, the first workflow can correspond to a workflow constructed based on a query. A second workflow can also be received 920. The ordering of one or more operators in the first logical expression is then modified 930 relative to a position of the instance of the Reduce operator. This can correspond to moving one or more operators from a position prior to the Reduce operator in the sequence to a position after the Reduce operator; moving one or more operators from a position after the Reduce operator in the sequence to a position prior to the Reduce operator; or a combination thereof. In various aspects, modifying the sequence of operators in the first logical expression can increase the number of operators in common at the beginning of the modified first logical expression and the second logical expression relative to the number of operators in common for the first logical expression and the second logical expression. Based on the modified first logical expression, a modified first workflow can be constructed 940. A beginning portion of the second workflow can then be executed 950. The beginning portion of the second workflow can correspond to operators that are in common between the beginning portion of the second workflow and the beginning portion of the modified first workflow. Execution 950 of the beginning portion of the second workflow can result in generation of an intermediate data set. An additional portion of the second workflow can then be executed 960 using the intermediate data set as an input. The additional portion of the second workflow can correspond to operators in the second logical expression after the operators in common with the modified first logical expression. Similarly, a portion of the modified first workflow 970 can be executed using the intermediate data set as an input. The portion of the modified first workflow can correspond to operators in the modified first logical expression after the common operators.

Figure 10:
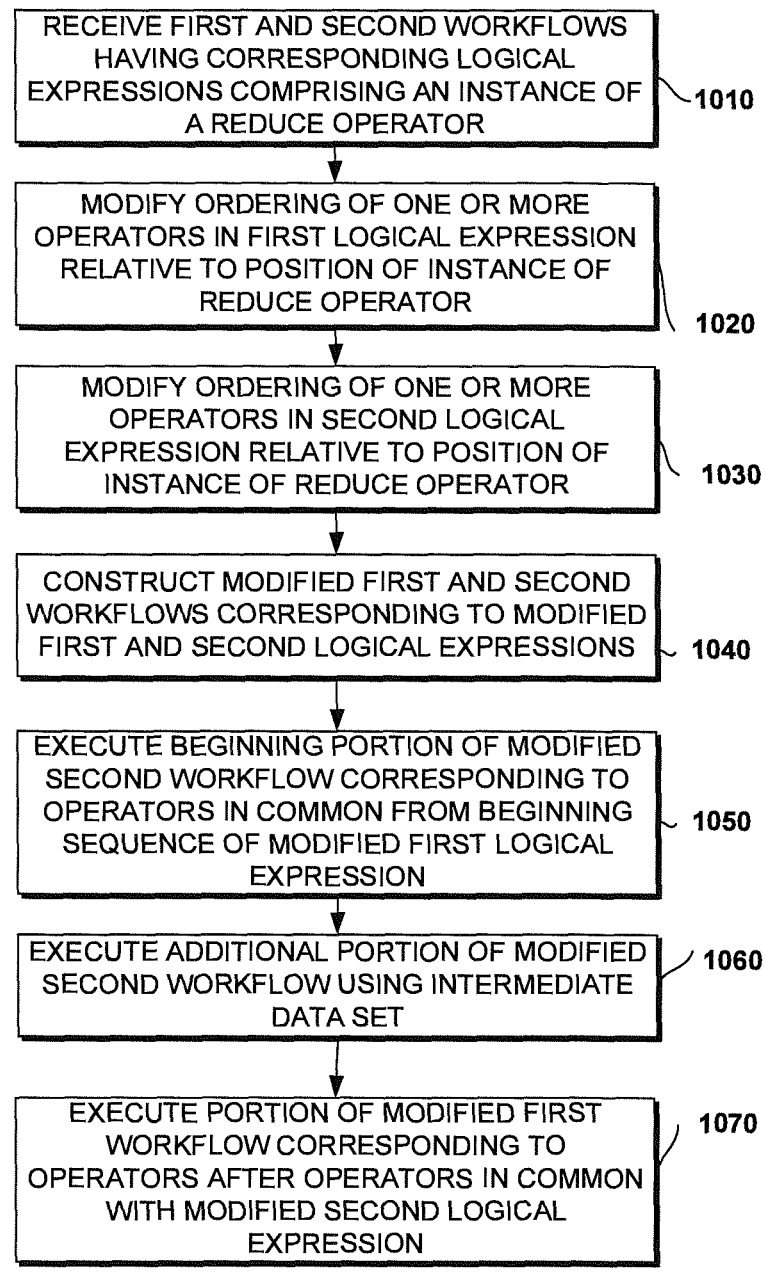

FIG. 10 shows an example for a method of using an expanded relational algebra to modify two workflows in order to identify common tasks between the beginning portions of the workflows. In FIG. 10, similar to FIG. 9, a first workflow and a second workflow are received 1010. The ordering of one or more operators in the first logical expression is then modified 1020 relative to a position of the instance of a Reduce operator. This can correspond to moving one or more operators from a position prior to the Reduce operator in the sequence to a position after the Reduce operator; moving one or more operators from a position after the Reduce operator in the sequence to a position prior to the Reduce operator; or a combination thereof. In various aspects, modifying the sequence of operators in the first logical expression can increase the number of operators in common at the beginning of the modified first logical expression and the second logical expression relative to the number of operators in common for the first logical expression and the second logical expression. Similarly, the ordering of one or more operators in the second logical expression can be modified 1030 relative to a position of the instance of the Reduce operator. Based on the modified first logical expression and modified second logical expression, a modified first workflow and modified second workflow can be constructed 1040. A beginning portion of the modified second workflow can then be executed 1050. The beginning portion of the modified second workflow can correspond to operators that are in common between the beginning portion of the modified second workflow and the beginning portion of the modified first workflow. Execution 1050 of the beginning portion of the modified second workflow can result in generation of an intermediate data set. An additional portion of the modified second workflow can then be executed 960 using the intermediate data set as an input. The additional portion of the second workflow can correspond to operators in the second logical expression after the operators in common with the modified first logical expression. Similarly, a portion of the modified first workflow 970 can be executed using the intermediate data set as an input. The portion of the modified first workflow can correspond to operators in the modified first logical expression after the common operators.

Additional Embodiments

Embodiment 1

A computer-implemented method for managing a distributed database, comprising: receiving a query defining a first workflow, the first workflow corresponding to tasks for processing data from one or more data sources, the query having a corresponding first logical expression comprising a sequence of operators from an expanded relational algebra, at least one operator in the first logical expression being an instance of a reduce operator; modifying an ordering of the operators in the first logical expression to form a modified first logical expression, the modifying of the ordering of the operators in the first logical expression comprising a) moving one or more operators from a position prior to the instance of the reduce operator to a position after the instance of the reduce operator, b) moving one or more operators from a position after the instance of the reduce operator to a position prior to the instance of the reduce operator, or c) a combination thereof; constructing a modified first workflow corresponding to the modified first logical expression; and executing at least a portion of the modified first workflow, wherein the modified first workflow has a lower execution cost than an execution cost of the first workflow.

Embodiment 2

The computer-implemented method of Embodiment 1, wherein moving one or more operators from a position prior to the instance of the reduce operator to a position after the instance of the reduce operator comprises moving a foreign key join operator from a position prior to the instance of the reduce operator to a position after the instance of the reduce operator.

Embodiment 3

The computer-implemented method of Embodiment 1 or 2, wherein executing at least a portion of the modified first workflow comprises executing tasks corresponding to all operators in the modified first logical expression.

Embodiment 4

The computer-implemented method of Embodiment 1 or 2, wherein executing at least a portion of the modified first workflow comprises executing tasks corresponding to fewer than all tasks in the first workflow defined by the query.

Embodiment 5

A computer-implemented method for managing a distributed database, comprising: receiving a first workflow corresponding to tasks for processing data from one or more data sources, the first workflow having a corresponding first logical expression comprising a sequence of operators from an expanded relational algebra, at least one operator in the first logical expression being an instance of a reduce operator; receiving a second workflow corresponding to tasks for processing data from the one or more data sources, the second workflow having a corresponding second logical expression comprising a sequence of operators from the expanded relational algebra, at least one operator in the second logical expression being an instance of the reduce operator; modifying an ordering of the operators in the first logical expression to form a modified first logical expression, a beginning sequence of the modified first logical expression having an increased number of operators in common with a beginning sequence of the second logical expression relative to a beginning sequence of the first logical expression, the modifying of the ordering of the operators in the first logical expression comprising a) moving one or more operators from a position prior to the instance of the reduce operator to a position after the instance of the reduce operator, b) moving one or more operators from a position after the instance of the reduce operator to a position prior to the instance of the reduce operator, or c) a combination thereof; optionally modifying an ordering of the operators in the second logical expression to form a modified second logical expression, a beginning sequence of the modified first logical expression having an increased number of operators in common with a beginning sequence of the modified second logical expression relative to a number of operators in common between a beginning sequence of the first logical expression and a beginning sequence of the second logical expression; constructing a modified first workflow corresponding to the modified first logical expression; optionally constructing a modified second workflow corresponding to the optionally modified second logical expression; executing a beginning portion of the (optionally modified) second workflow to form an intermediate data set, the executed portion of the (optionally modified) second workflow corresponding to the operators in common from the beginning sequence of the modified first logical expression; executing an additional portion of the (optionally modified) second workflow using the intermediate data set; and executing a portion of the modified first workflow using the intermediate data set, the executed portion of the modified first workflow corresponding to operators in the sequence for the modified first logical expression located after the operators in common with the (optionally modified) second logical expression.

Embodiment 6

The computer-implemented method of Embodiment 5, wherein the modified first workflow has a lower execution cost than an execution cost of the first workflow.

Embodiment 7

The computer-implemented method of Embodiment 5, wherein a combined execution cost of the modified first workflow and the (optionally modified) second workflow is lower than a combined execution cost of the first workflow and the (optionally modified) second workflow.

Embodiment 8

The computer-implemented method of any of Embodiments 5-7, wherein the first workflow is constructed based on a query.

Embodiment 9

The computer-implemented method of any of Embodiments 5-8, wherein the beginning sequence of the second logical expression has no operators in common with the beginning sequence of the first logical expression.

Embodiment 10

The computer-implemented method of any of Embodiments 5-9, wherein moving one or more operators from a position prior to the instance of the reduce operator to a position after the instance of the reduce operator comprises moving a foreign key join operator from a position prior to the instance of the reduce operator to a position after the instance of the reduce operator.

Embodiment 11

The computer-implemented method of any of Embodiments 5-10, wherein moving one or more operators from a position after the instance of the reduce operator to a position prior to the instance of the reduce operator comprises moving a foreign key join operator from a position after the instance of the reduce operator to a position prior to the instance of the reduce operator.

Embodiment 12

The computer-implemented method of any of Embodiments 5-11, wherein executing a portion of the modified first workflow using the intermediate data set comprises executing tasks corresponding to all operators in the modified first logical expression located after the operators in common with the (optionally modified) second logical expression.

Embodiment 13

The computer-implemented method of any of Embodiments 5-11, wherein executing a portion of the modified first workflow using the intermediate data set comprises executing tasks corresponding to fewer than all operators in the modified first logical expression located after the operators in common with the (optionally modified) second logical expression.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention have been described to be illustrative rather than restrictive. It will be understood that certain features and subcombinations are of utility and may be employed without reference to other features and subcombinations. This is contemplated by and is within the scope of the claims.

What is claimed is:

1. A computer-implemented method for managing a distributed database, comprising:

receiving a query defining a first workflow, the first workflow corresponding to tasks for processing data from one or more data sources, the query having a corresponding first logical expression comprising a sequence of operators from an expanded relational algebra, at least one operator in the first logical expression being an instance of a reduce operator;

modifying an ordering of the operators in the first logical expression to form a modified first logical expression, a beginning sequence of the modified first logical expression having an increased number of operators in common with a beginning sequence of a second logical expression of a second workflow relative to a beginning sequence of the first logical expression, the modifying of the ordering of the operators in the first logical expression comprising a) moving one or more operators from a position prior to the instance of the reduce operator to a position after the instance of the reduce operator, b) moving one or more operators from a position after the instance of the reduce operator to a position prior to the instance of the reduce operator, or c) a combination thereof;

constructing a modified first workflow corresponding to the modified first logical expression; and executing at least a portion of the modified first workflow using an intermediate data set formed by execution of a portion of the second workflow, the executed portion of the modified first workflow corresponding to operators in the sequence for the modified first logical expression located after the operators in common with the second logical expression;

wherein the modified first workflow has a lower execution cost than an execution cost of the first workflow.

2. The computer-implemented method of claim 1, wherein moving one or more operators from a position prior to the instance of the reduce operator to a position after the instance of the reduce operator comprises moving a foreign key join operator from a position prior to the instance of the reduce operator to a position after the instance of the reduce operator.

3. The computer-implemented method of claim 1, wherein executing at least a portion of the modified first workflow comprises executing tasks corresponding to all operators in the modified first logical expression.

4. The computer-implemented method of claim 1, wherein executing at least a portion of the modified first workflow comprises executing tasks corresponding to fewer than all tasks in the first workflow defined by the query.

5. A computer-implemented method for managing a distributed database, comprising:

receiving a first workflow corresponding to tasks for processing data from one or more data sources, the first workflow having a corresponding first logical expression comprising a sequence of operators from an expanded relational algebra, at least one operator in the first logical expression being an instance of a reduce operator;

receiving a second workflow corresponding to tasks for processing data from the one or more data sources, the second workflow having a corresponding second logical expression comprising a sequence of operators from the expanded relational algebra, at least one operator in the second logical expression being an instance of the reduce operator;

modifying an ordering of the operators in the first logical expression to form a modified first logical expression, a beginning sequence of the modified first logical expression having an increased number of operators in common with a beginning sequence of the second logical expression relative to a beginning sequence of the first logical expression, the modifying of the ordering of the operators in the first logical expression comprising a) moving one or more operators from a position prior to the instance of the reduce operator to a position after the instance of the reduce operator, b) moving one or more operators from a position prior to the instance of the reduce operator to a position prior to the instance of the reduce operator, or c) a combination thereof;

constructing a modified first workflow corresponding to the modified first logical expression;

executing a beginning portion of the second workflow to form an intermediate data set, the executed portion of the second workflow corresponding to the operators in common from the beginning sequence of the modified first logical expression;

executing an additional portion of the second workflow using the intermediate data set; and executing a portion of the modified first workflow using the intermediate data set, the executed portion of the modified first workflow corresponding to operators in the sequence for the modified first logical expression located after the operators in common with the second logical expression.

6. The computer-implemented method of claim 5, wherein the modified first workflow has a lower execution cost than an execution cost of the first workflow.

7. The computer-implemented method of claim 5, wherein the first workflow is constructed based on a query.

8. The computer-implemented method of claim 5, wherein the beginning sequence of the second logical expression has no operators in common with the beginning sequence of the first logical expression.

9. The computer-implemented method of claim 5, wherein moving one or more operators from a position prior to the instance of the reduce operator to a position after the instance of the reduce operator comprises moving a foreign key join operator from a position prior to the instance of the reduce operator to a position after the instance of the reduce operator.

10. The computer-implemented method of claim 5, wherein moving one or more operators from a position after the instance of the reduce operator to a position prior to the instance of the reduce operator comprises moving a foreign key join operator from a position after the instance of the reduce operator to a position prior to the instance of the reduce operator.

11. The computer-implemented method of claim 5, wherein executing a portion of the modified first workflow using the intermediate data set comprises executing tasks corresponding to all operators in the modified first logical expression located after the operators in common with the second logical expression.

12. The computer-implemented method of claim 5, wherein executing a portion of the modified first workflow using the intermediate data set comprises executing tasks corresponding to fewer than all operators in the modified first logical expression located after the operators in common with the second logical expression.

13. A computer-implemented method for managing a distributed database, comprising:

receiving a first workflow corresponding to tasks for processing data from one or more data sources, the first workflow having a corresponding first logical expression comprising a sequence of operators from an expanded relational algebra, at least one operator in the first logical expression being an instance of a reduce operator;

receiving a second workflow corresponding to tasks for processing data from the one or more data sources, the second workflow having a corresponding second logical expression comprising a sequence of operators from the expanded relational algebra, at least one operator in the second logical expression being an instance of the reduce operator;

modifying an ordering of the operators in the first logical expression to form a modified first logical expression, the modifying of the ordering of the operators in the first logical expression comprising a) moving one or more operators from a position prior to the instance of the reduce operator to a position after the instance of the reduce operator, b) moving one or more operators from a position after the instance of the reduce operator to a position prior to the instance of the reduce operator, or c) a combination thereof;

modifying an ordering of the operators in the second logical expression to form a modified second logical expression, a beginning sequence of the modified first logical expression having an increased number of operators in common with a beginning sequence of the modified second logical expression relative to a number of operators in common between a beginning sequence of the first logical expression and a beginning sequence of the second logical expression;

constructing a modified first workflow corresponding to the modified first logical expression;

constructing a modified second workflow corresponding to the modified second logical expression;

executing a beginning portion of the modified second workflow to form an intermediate data set, the executed portion of the modified second workflow corresponding to the operators in common from the beginning sequence of the modified first logical expression;

executing an additional portion of the modified second workflow using the intermediate data set; and executing a portion of the modified first workflow using the intermediate data set, the executed portion of the modified first workflow corresponding to operators in the sequence for the modified first logical expression located after the operators in common with the modified second logical expression.

14. The computer-implemented method of claim 13, wherein a combined execution cost of the modified first workflow and the modified second workflow is lower than a combined execution cost of the first workflow and the second workflow.

15. The computer-implemented method of claim 13, wherein the first workflow is constructed based on a query.

16. The computer-implemented method of claim 13, wherein the beginning sequence of the second logical expression has no operators in common with the beginning sequence of the first logical expression.

17. The computer-implemented method of claim 13, wherein moving one or more operators from a position prior to the instance of the reduce operator to a position after the instance of the reduce operator comprises moving a foreign key join operator from a position prior to the instance of the reduce operator to a position after the instance of the reduce operator.

18. The computer-implemented method of claim 13, wherein moving one or more operators from a position after the instance of the reduce operator to a position prior to the instance of the reduce operator comprises moving a foreign key join operator from a position after the instance of the reduce operator to a position prior to the instance of the reduce operator.

19. The computer-implemented method of claim 13, wherein executing a portion of the modified first workflow using the intermediate data set comprises executing tasks corresponding to all operators in the modified first logical expression located after the operators in common with the modified second logical expression.

20. The computer-implemented method of claim 13, wherein executing a portion of the modified first workflow using the intermediate data set comprises executing tasks corresponding to fewer than all operators in the modified first logical expression located after the operators in common with the modified second logical expression.

* * * * *